Figure 1:
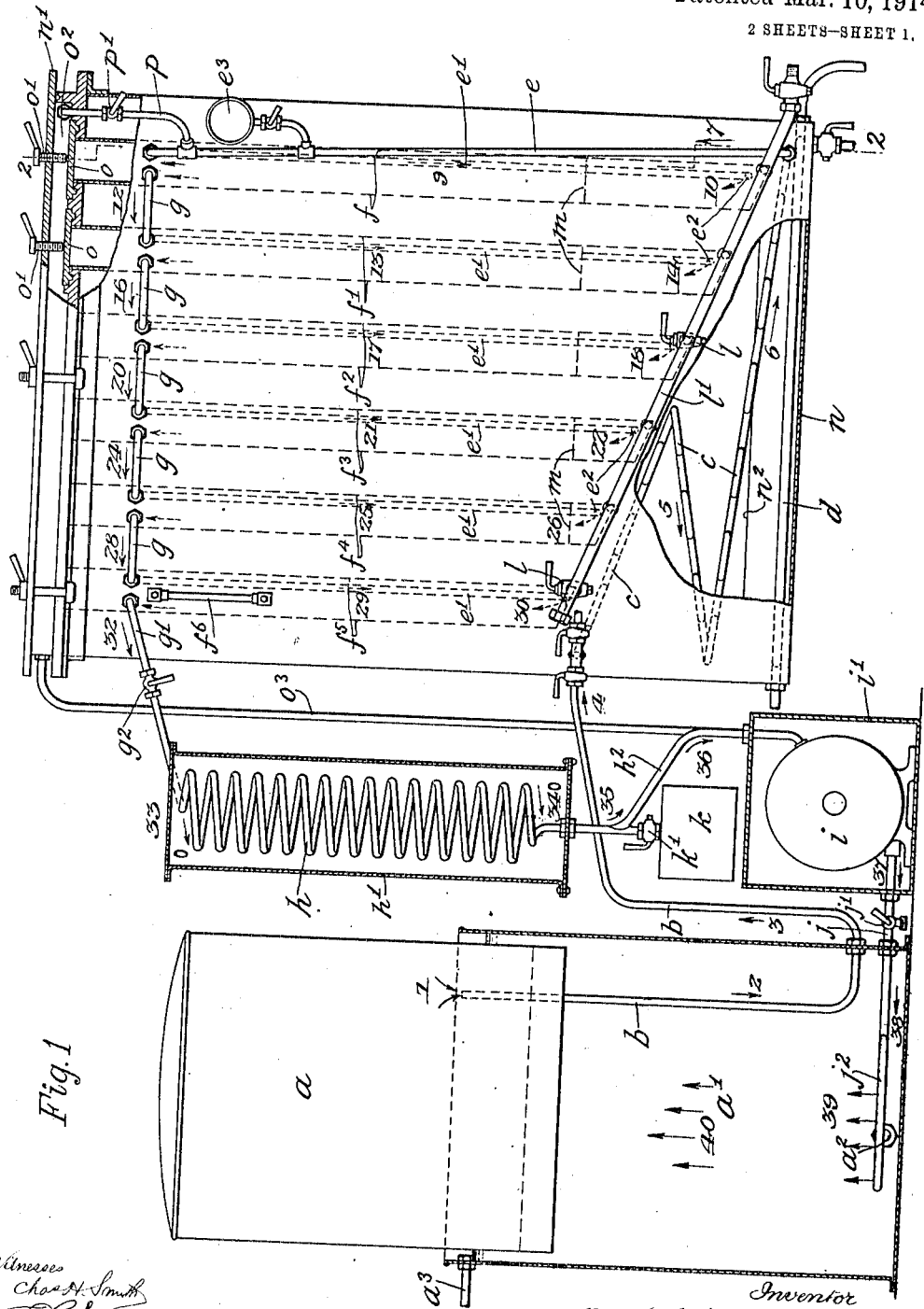

O. G. C. L. J. OVERBECK.
DEALCOHOLIZING LIQUIDS.
APPLICATION FILED JAN. 10, 1911.

1,089,862.

Patented Mar. 10, 1914.
2 SHEETS—SHEET 1.

Inventor
Otto G. C. L. J. Overbeck.
by Harold Serrell
his atty.

O. G. C. L. J. OVERBECK.
DEALCOHOLIZING LIQUIDS.
APPLICATION FILED JAN. 10, 1911.
1,089,862.
Patented Mar. 10, 1914.
2 SHEETS—SHEET 2.
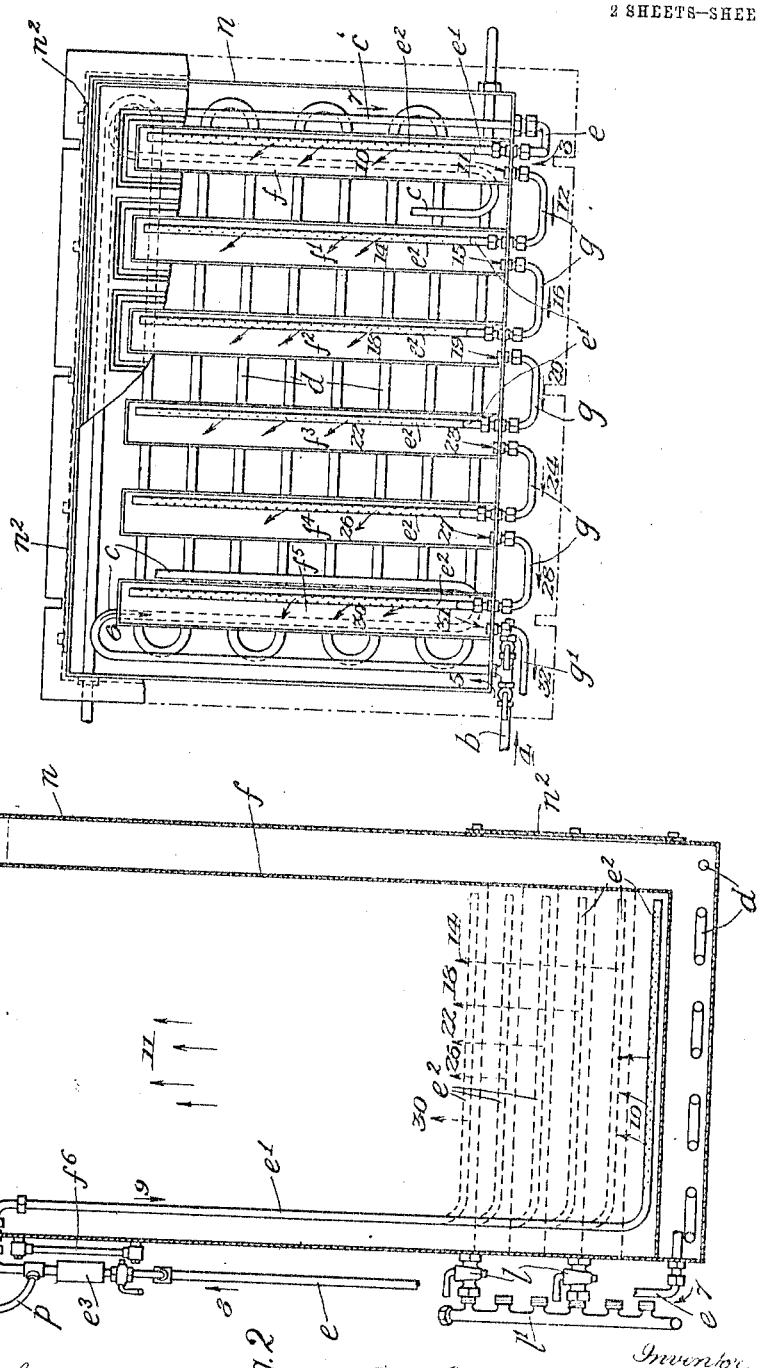

UNITED STATES PATENT OFFICE.

OTTO G. C. L. J. OVERBECK, OF GREAT GRIMSBY, ENGLAND.

DEALCOHOLIZING LIQUIDS.

1,089,862.

Specification of Letters Patent. Patented Mar. 10, 1914.

Application filed January 10, 1911. Serial No. 601,866.

*To all whom it may concern:*

Be it known that I, OTTO GERHARDT CHRISTOF LUDWIG JOSEPH OVERBECK, a subject of the King of Great Britain, residing at Great Grimsby, in the county of Lincoln, England, have invented new and useful Improvements in Dealcoholizing Liquids, of which the following is a specification.

The object of the present invention is to de-alcoholize various liquids without submitting them to a boiling process and without the employment of a vacuum pan.

By means of my invention liquids may be de-alcoholized and the alcohol may or may not be collected. Whether or not the alcohol is collected depends to some extent upon the nature of the liquid under treatment. Thus when beer is treated the object is to obtain a non-alcoholic beverage and the alcohol generally speaking will be run to waste, but when distillers' wort is treated the alcohol will be collected.

According to the present invention I place the liquid to be treated in a number of closed tanks, preferably of various heights, the bottoms being arranged one slightly below the bottom of a next adjacent tank. Carbonic acid gas at a pressure of about 2½ pounds per square inch is caused to enter the lower part of the first tank, it passes up through the liquid in the lower part of that tank and escapes at the upper part of the tank. It is then conducted to the lower part of the second tank and passes up through the liquid. The carbonic acid gas thus passes up through all the tanks and blows all or nearly all the liquid into froth. Means are provided for ascertaining the height of the froth in the last vessel so that it may be prevented from passing out of the tanks. The carbonic acid gas, after it has left the last tank, passes through a cooling coil and then into the water contained in the lower part of a gasometer and rises through the water into the upper part of the gasometer, whence it is caused to pass through coils where it is warmed previous to again entering the first tank. The process is thus a continuous one, the gas being used time after time until the required amount of or all alcohol is removed from the liquid.

When treating distillers' wort the liquid is warmed to about 90° F. in an atmosphere of carbonic acid and I then commence to pass the gas through it. The heating is continued until the temperature reaches about 170° F. During the whole of this time the gas continues to pass through the liquid. Beer however is not raised beyond 120° F.

In the accompanying drawings I have shown apparatus suitable for carrying out the process.

Figure 1 is a side elevation of the complete apparatus, some parts being shown in section and some being broken away. Fig. 2 is a vertical section taken on the line 2—2 of Fig. 1, and Fig. 3 is a plan, parts being broken away, of the chamber in which are arranged the tanks to contain the liquid to be treated.

$a$ and $a'$ are the upper and lower parts of a gasometer. The tank $a'$ is nearly filled with water and the bell $a$ contains carbonic acid.

$b$ is a pipe the upper end of which rises above the level of the water. The pipe $b$ passes through the side of the tank $a'$ and communicates with coils $c$ in which the gas is heated by the steam coils $d$ located beneath the coils $c$, it being understood that the steam coils $d$ heat the liquid in the tank $n$ and the gas in the pipe $c$ is heated directly by the heated liquid surrounding these pipes. In Fig. 3 only some of the coils $c$ are shown to prevent confusion but they are fully shown in Fig. 1.

From the coils $c$ the gas passes up the pipe $e$ through one side of the first tank $f$ down the pipe $e'$ in said tank. At its lower end the pipe $e'$ is bent into a horizontal position and is provided with perforations. It thus becomes a rake or rouser which is marked $e^2$. The gas blows through the liquid and finally escapes through the pipe $g$ leading from the upper part of one tank to the upper part of the next tank $f'$. This tank contains another pipe $e'$ and another rake or rouser $e^2$. All the tanks $f\ f'\ f^1\ f^3\ f^1\ f^5$ each contain a pipe $e'$ and rake or rouser $e^2$ and they are each connected to the next tank by a pipe $g$. The gas finally passes through the pipe $g'$ provided with a cock $g^2$ into the cooling coil $h$ located in a casing $h'$. From the coil $h$ the gas passes through a pipe $h^2$ into a pump $i$ in the casing $i'$ and escapes from the pump through the pipe $j$ provided with the two-way cock $j'$. The pipe $j$ enters the tank $a'$ and is formed into a coil $j^2$ provided with perforations through which the gas escapes into the water. The course of the gas is clearly indicated in Fig.

1 by means of the arrows which are numbered consecutively 1 to 40, following the path of the gas.

Directly below the cooling coil $h$ and connected therewith is a tank $k$ provided with a cock $k'$. If the casing $h'$ is packed with ice the alcohol will drip into the tank $k$ when the cock $k'$ is open. If this latter be closed and the casing $h'$ be filled with water only the alcohol will pass with the gas through the pump $i$ and be retained in the water in the tank $a'$, which latter may be provided with a water inlet $a^2$ and an overflow $a^3$ both of which, if left open, will cause the alcohol to flow away with the water.

The tanks $f$, $f'$, $f^2$, $f^3$, $f^4$, $f^5$, are each provided with a sloping bottom and they are all connected by cocks $l$ with an inclined pipe $l'$. The tank $f^5$ is provided with a sight gage $f^6$ to indicate the level of the froth in this tank.

$m$ indicates the level of the liquid to be treated. This gradually passes with the gas in a condition of froth toward the tank $f^5$. By means of the cocks $l$ and inclined pipe $l'$ the liquid is allowed to pass back into the longer tanks.

The tanks $f$, $f'$, $f^2$, $f^3$, $f^4$, $f^5$, are located in a water tank $n$ having a gas-tight cover $n'$. Each tank $f$, $f'$, $f^2$, $f^3$, $f^4$, $f^5$, has a cover $o$ which is held in close contact with its tank by screws $o'$ passing through the cover $n'$.

The pipe $e$ has a branch $p$ provided with a cock $p'$, which branch enters the space $o^2$. This space is connected by a pipe $o^3$ with the pipe $h^2$. If the cock $p'$, Fig. 2, be open and if the cock $q^2$, Fig. 1, be closed, the air in the space $o^2$ will be removed and will pass away through the two-way cock $j'$ which is open to atmosphere for that purpose and is closed to the tank $a'$ to prevent the water escaping. By this means the space $o^2$ is filled with carbonic acid gas before the process of de-alcoholizing is started.

The water tank $n$ is provided with a manhole and cover $n^2$. The pipe $e'$ is fitted with a manometer $e^3$.

What I claim is:—

1. The herein described process for de-alcoholizing liquids, which consists first in placing the liquid under a positive atmospheric pressure, then raising the temperature of the liquid to about 90° F., then blowing the liquid into froth by passing carbonic acid gas through the liquid in sufficient quantities, then cooling the mixture of carbonic acid gas and alcohol and finally passing the mixture through a body of water.

2. The herein described process for de-alcoholizing liquids, which consists first in placing the liquid under a slight and positive atmospheric pressure, then replacing with carbonic acid gas any air which there may be in the receptacle containing the liquid, then raising the temperature of the liquid to about 90° F., then blowing the liquid into froth by passing carbonic acid gas through the liquid in sufficient quantities and continuing the same until the liquid has been de-alcoholized to the desired extent, then cooling the mixture of carbonic acid gas and alcohol and finally passing the said mixture through a body of water which absorbs the alcohol therein.

3. The herein described process for de-alcoholizing liquids, which consists in placing the liquid under a positive atmospheric pressure, then raising the temperature of the liquid to about 90° F., and then blowing the liquid into froth by passing carbonic acid gas through the liquid in sufficient quantities.

In witness whereof I have hereunto set my hand in the presence of two witnesses.

OTTO G. C. L. J. OVERBECK.

Witnesses:
MARY DIXON,
FRANCES E. BROWN.